May 13, 1952 A. E. WARD 2,596,629
TOWING MAST FOR TRUCKS
Filed Dec. 27, 1949 2 SHEETS—SHEET 1
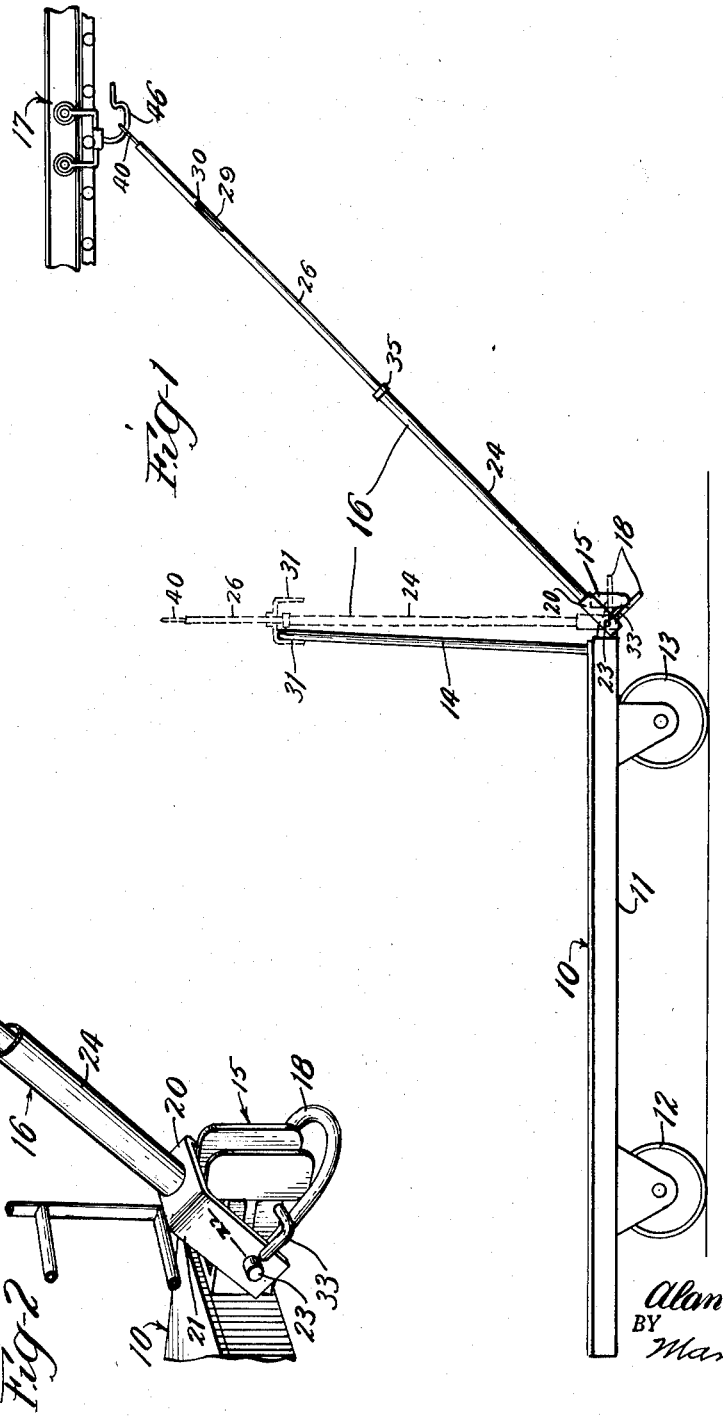
INVENTOR.
Alan Edwin Ward
BY Mann and Brown
Attys.

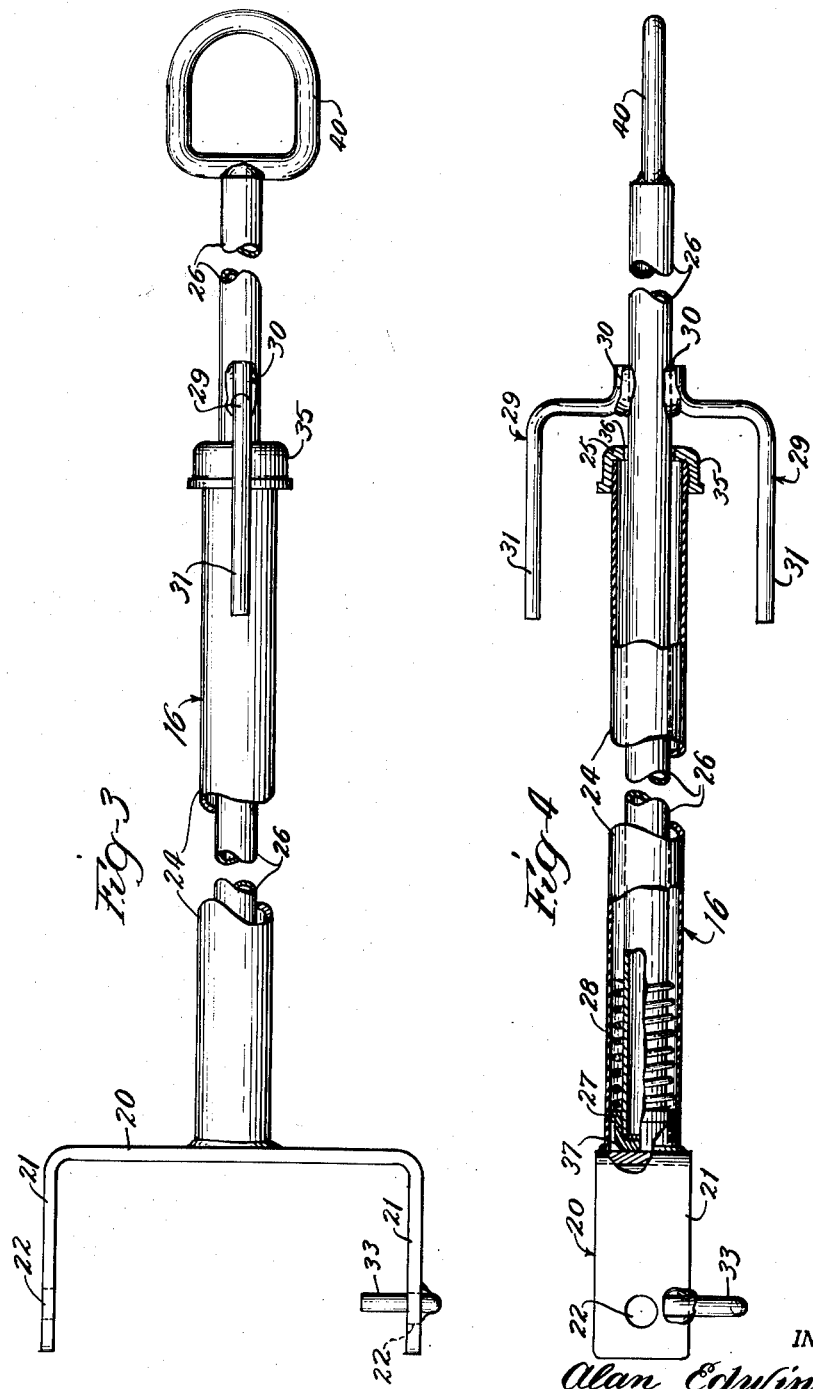

Patented May 13, 1952

2,596,629

UNITED STATES PATENT OFFICE 2,596,629

TOWING MAST FOR TRUCKS

Alan Edwin Ward, Chicago, Ill.

Application December 27, 1949, Serial No. 135,049

6 Claims. (Cl. 280—47)

This invention relates to towing masts for trailer trucks, such as commonly used for handling freight at railway terminals, warehouses, etc., and has for its principal objects to provide a simple, safe mast that can be easily made fast to a truck and readily put into operative or inoperative position with safety.

Generally speaking, the preferred embodiment here shown and described includes a base adapted to be hinged to a truck to swing between operative and inoperative positions, a tongue fixed to the base, and a handle telescoped with the tongue and provided with a hand grasp arranged for safe operation of the mast and a latch to secure it in inoperative position.

In the drawings:

Fig. 1 is a diagrammatic side view of the mast connecting a truck with an overhead trolley;

Fig. 2 is an enlarged perspective view of the lower end of the mast and the coupler of a truck;

Fig. 3 is a plan view of the mast with intermediate parts broken away; and

Fig. 4 is a side elevation of the mast partly in section.

But these diagrammatic drawings and the corresponding description are used for the purpose of disclosure only.

In Fig. 1, a conventional truck 10 is shown composed of a platform frame 11 mounted on rear wheels 12 and front casters 13, and provided with one or more racks 14 and a coupler generally indicated by 15. The mast, generally indicated by 16, is shown in Fig. 1, connecting the truck with a hook 46 of an overhead trolley generally indicated by 17.

The coupler 15 is of familiar form and includes a loop or link 18 pivoted to swing between the solid and dotted line positions shown in Fig. 1, and serving to couple with or to release the cooperating tail coupler of an adjacent truck. Such tail coupler may include a projecting hook-like member adapted to enter between the jaws of the coupler 15 when the link 18 is in lowered position and to become connected thereto when the link is swung to raised position.

The mast includes what will be called a base 20, roughly U-shaped, having arms 21 adapted to straddle a coupler 15 and provided with aligned openings 22 to receive a special pin 23 longer than the conventional coupler pin, which it replaces. Welded to the base 20 at the middle is a tongue 24 of tubular form having an internal shoulder 25 at its outer end. Telescoped within the tongue is a handle bar 26, also tubular, and having an external shoulder 27 adapted to cooperate with the internal shoulder 25 on the tongue. Between those shoulders and adapted to cooperate with them to cushion outward movement of the handle is a helical spring 28.

The handle bar is equipped with two angular rods 29, here shown as identical, welded to the handle bar at 30 and having arms 31 spaced from the handle bar and the tongue in folded or short position, one of which serves as a hand grasp and the other as a latch adapted to catch the upper portion of the front rack 14, as shown in Fig. 1, to secure the mast in inoperative, folded position.

One arm 21 of the base is provided with an angular trip or trigger 33 formed of a rod welded to the arm 21 and bent inwardly to cooperate with the coupler ring or loop 18, as shown in Figs. 1 and 2, to swing it to inoperative position when the mast is in use, and allow it to assume normal, upper position shown in dotted lines in Fig. 1 when the mast is folded to inoperative position.

In this particular embodiment of the invention, the base is made of ⅜" bar stock, 3" wide. Its arms are 6½" long and spaced 11" apart in the clear. The tongue is made of a 3' length of 2" standard pipe, screw threaded at the outer end and fitted with a standard 2" cap 35 having an opening 36 in the center approximately 1¹¹⁄₃₂" in diameter. The handle bar is made of a 4' length of 1" standard pipe threaded at its inner end to receive a standard 1" pipe cap 37. The angular pieces 29 forming the handle and the latch are made of 1" round stock having one end welded to the handle bar and bent to provide arms 31, 7" long and spaced 2¾" from the handle bar.

At its free end, the handle bar is provided with a D-shaped ring 40 welded to it and serving as a connecting loop for engagement with the hook 16 of the trolley or serving as a hand grasp when the truck is moved by hand.

In use, the mast will be connected to a truck by removing the customary pin and substituting the pin 23 so as to pivot the base of the mast to the coupler as shown for swinging movement about a horizontal axis between the positions shown in Fig. 1. When the truck is to be connected to a trolley, the mast will be moved from the position shown in dotted lines in Fig. 1 to the position shown in solid lines and connected to the hook 16 of the trolley. Unavoidably, this extends the mast by moving the handle bar outwardly with respect to the tongue until the spring 28 is caught between the internal shoulder 25 and the external shoulder 27, when the arm is a resilient stop against further extension and cushioning the pull on the loop 40.

I claim:

1. In a towing mast for a truck having a movable coupler member, a base pivotally connected to the truck to swing about a substantially horizontal axis, a trip connected to the base to swing therewith to actuate the movable coupler member, a tongue secured to the base, a handle telescoped with and rotatable with respect to the tongue, a hand grasp mounted on one side of the handle, and a latch mounted on another side of the handle.

2. In a towing mast for a truck having a movable coupler member, a base pivotally connected to the truck to swing about a substantially horizontal axis, a trip connected to the base to swing therewith to actuate the movable coupler member, a tongue secured to the base, a handle telescoped with the tongue, and a hand grasp mounted on the handle.

3. In a towing mast for a truck having a movable coupler member, a base pivotally connected to the truck to swing about a substantially horizontal axis, a trip on the base to swing therewith to actuate the movable coupler member, a tongue secured to the base, a handle telescoped with the tongue, and an angular piece mounted on the handle serving as a hand grasp for the mast.

4. In a towing mast for a truck having a coupler and a link swingable thereon for engaging and disengaging the coupler of another truck, a base pivoted to the coupler for swinging movement to raised and lowered positions, an elongated tongue having one end secured to the base, a handle adjustably mounted on the tongue, and a trip operatively connected to the base and engaged with the link to swing the link to uncoupling position when the tongue is swung to lowered position.

5. In a towing mast for a truck having at its forward portion an elevated rack, a base hinged to the truck to swing about a fixed horizontal axis below said rack, a tubular tongue secured to the base, a handle bar telescoped relatively to the tongue and projecting from the free end thereof, and means for latching the tongue in upright position comprising a hook formed on the projecting end portion of said handle bar adapted to hook over the rack when the tongue is substantially upright and the handle bar has been telescoped downwardly relatively to the tongue.

6. In a towing mast for a truck having at its forward portion a coupler and an elevated rack, a base hinged to the truck below said rack and adjacent to said coupler, a tubular tongue secured to the base, a handle bar telescoped within the tongue, and means for latching the tongue in upright position comprising an arm formed on the handle bar adapted to hook over the rack when the tongue is substantially upright and the handle bar has been telescoped downwardly therein, said coupler including a movable member swingable with said tongue to an operative position engageable with the coupler member of another truck when the tongue is substantially upright and to an inoperative position when the tongue is lowered.

ALAN EDWIN WARD.

REFERENCES CITED

The following references are of record in the file of this patent:

UNITED STATES PATENTS

| Number | Name | Date |
|---|---|---|
| 594,729 | Crosby | Nov. 30, 1897 |
| 757,859 | Bridgman | Apr. 19, 1904 |
| 1,654,939 | Loebs | Jan. 3, 1928 |
| 1,848,956 | Koehler | Mar. 8, 1932 |
| 2,215,765 | Petersen | Sept. 24, 1940 |
| 2,424,095 | Horton | July 15, 1947 |